United States Patent [19]

Lang

[11] 3,914,480

[45] Oct. 21, 1975

[54] PROCESS FOR THE PREPARATION OF A FLY FISHING LINE AND THE RESULTING ARTICLE

[76] Inventor: John L. Lang, 42 Windgate Drive, Box 820-111, Murrysville, Pa. 15668

[22] Filed: Aug. 21, 1969

[21] Appl. No.: 852,095

Related U.S. Application Data

[63] Continuation-in-part of Ser. No. 242,911, Dec. 7, 1962, abandoned.

[52] U.S. Cl. .................. 428/395; 43/44.98; 427/385
[51] Int. Cl. ......................... B32b 27/02; B44d 5/00
[58] Field of Search ............ 43/44.98; 260/859 PV; 117/138.8 N, 138.8 A, 161 KP

[56] References Cited

UNITED STATES PATENTS

| | | | |
|---|---|---|---|
| 2,606,162 | 8/1952 | Coffey et al. | 260/859 PV |
| 2,872,430 | 2/1959 | Parker et al. | 260/859 PV |
| 2,993,813 | 7/1961 | Tischbein | 117/161 KP |
| 3,042,548 | 7/1962 | Aikens | 117/113 |
| 3,043,045 | 7/1962 | Martuch | 43/44.98 |
| 3,210,215 | 10/1965 | Aitken et al. | 260/859 PV |
| 3,210,439 | 10/1965 | Aitken et al. | 260/859 PV |

FOREIGN PATENTS OR APPLICATIONS

| | | | |
|---|---|---|---|
| 727,321 | 3/1955 | United Kingdom | 117/161 |
| 149,423 | 12/1952 | Australia | 117/161 |
| 147,989 | 9/1952 | Australia | 260/859 PV |
| 552,328 | 1/1958 | Canada | 260/859 PV |

*Primary Examiner*—William D. Martin
*Assistant Examiner*—Sadie L. Childs
*Attorney, Agent, or Firm*—Laurence, Stokes & Neilan

[57] ABSTRACT

A coated fly fishing line and a process for the preparation of the same, in which the coating comprises at least two reagents required to form a flexible condensation polymer and less than 31% (percent by parts of total mixture) of a gelling agent. The coating may also contain additives to stabilize the line coating, make the line float, make it sink, etc.

8 Claims, No Drawings

PROCESS FOR THE PREPARATION OF A FLY FISHING LINE AND THE RESULTING ARTICLE

CROSS-REFERENCES TO RELATED APPLICATIONS

This application is a continuation-in-part of my earlier application, Ser. No. 242,911, filed Dec. 7, 1962, and now abandoned, and entitled "Reactions of Solids and Gels", hereby abandoned in favor of this instrument.

BACKGROUND OF THE INVENTION

The so-called "plastisol" method is well known in the commercial technology of plastics. A polymer, usually poly(vinyl chloride) is mixed with a plasticizer, such as dioctyl phthalate, in which the polymer is insoluble at ordinary temperatures, and which becomes a soluble or compatable coherent mixture, usually elastomer, when heated. This technique has many commercial uses.

The types and number of polymers suited to this technique are limited. Almost all of the commercial compositions are limited to poly(vinyl chloride); although other expensive or exotic polymers, such as poly(vinyl bromide) or poly(vinyl iodide), can be adapted to this technique.

SUMMARY OF THE INVENTION

Heretofore, it has been the practice in plastisol technology to prepare a polymer, add a minor amount of plasticizer, shape and cure it, usually by heating. When a major amount of plasticizer is used, a weak, "chessy" product is obtained, which does not possess the qualities of durability required for use in practical application.

It has now been found that one can mix a major amount of certain plasticizers with a minor amount of polymer, gel the mixture into a desired shape, and polymerize the plasticizer to convert it into a tough, abrasion-resistant, shaped structure.

This reversal of technique provides a means for preparation of a new and novel plastisol system, comprising a plasticizer system which is capable of further polymerization to tougher products, a gelling agent therefore, optionally with polymerization catalysts, fillers, coloring materials, density regulating agents, so that an object or coating can be made to be more useful than products of the conventional systems.

Some compositions provide co-gelling systems, by virtue of their respective reactive groups on the part of both plasticizer and gelling agents.

The process of this invention produces shaped articles whereby a shaped mixture is gelled to retain the desired shape, then further dimensionally stabilized and made stronger by further polymerization of at least a part of the mixture. All of the required components are usually present in the initial mixture. Some of these compositions may be chosen to be self-foaming, in order that one may produce an object having a low density.

The linear, branched or cross-linked (or mixtures thereof) products of the processes of this invention are useful as coatings, films, shaped articles as insulators, as sound insulators and building materials, etc.

A particularly proper use for this process is in the preparation of fly-fishing lines. These are usually made by selection of a tough poly(vinyl chloride) plastisol, incorporation therein of very small hollow spheres ("microballoons") or powdered metals to change the density thereof. Since in fly-fishing, the weight of the line is the site in which the energy is "stored" in order to cast the fly for any useful distances, it must have weight because the fly has virtually no weight.

In contrast, it should be noted that when a fisherman casts a plug or spoon type of fish lure, these lures have weight, and their mass is the site of storage of the inertial energy to carry the lure for appreciable distances.

The anomaly in fly-fishing is that in dry-fly fishing, the line must be heavy so it can enable the fisherman to cast the fly, yet light enough to float, so it will not pull the fly beneath the surface of the water. The aforementioned poly(vinyl chloride) plastisol works well enough to dominate the market, but the tougher polyester, polyamide, polyurea, polyurethane, polyepoxy, polyolefin, and polycarbonate formulations of the present invention are much better because they are tougher and more abrasion resistant than the previously used materials.

DESCRIPTION OF PREFERRED EMBODIMENT

The low molecular weight, further polymerizable plasticizers may be those which contain chemical groupings which can be converted to ester, amide, urea, urethane, carbonate, epoxy reaction products, long chains of carbon atoms, and those having at least one polymerizable double bond, such as the divinyl ether of a polyglycol.

Such low molecular weight, plasticizer type materials thus have alcohol, sulfonic acid, carboxylic acids, boric acid, phosphoric acid, adipic and other organic dibasic acids, sulfonyl halides, carboxylic acid halides, acid chlorides of organic dicarboxylic acids, amine, glycidyl ethers, amide, allyl and vinyl groups.

Co-reagents with the acid halides, urethanes, carbon suboxides, mixed function reagents, polyesters, etc., are usually those compounds having at least one group which reacts with the Zerewitinoff-Chugaev reagent, viz., alcohols, amines, acids, etc. Examples of such compounds are the alkyl alcohols and diols, alkaryl alcohols and diols, especially ethylene- and propylene-glycols, and other polymeric diols, glycerine, pentaerythritol, sugars, mucic acid, mono-, di-, and polybasic acids, silicic, boric and phosphoric acids, ethylene-, hexamethylene- and other -diamines, as diaminobenzene, -anthracene and other aromatic nuclei, benzidine, hexamethylene tetramine, thio-di-acids, dithiols, low molecular weight polymers such as polyesters and polyamides, the homologs, derivatives, equivalents of the above, and suitable mixtures thereof.

Other reactive compounds include isocyanate, di- and poly-isocyanates, carbon sub-oxide and certain other ketene derivatives, and their progenitors, such as carbamyl halides, malonic acid, malonyl halides, diacetyl tartaric anhydride and the like, homologs, derivatives, equivalents thereof, and mixtures thereof, such as those compounds having groups reactive with the same chemical groups which are reactive with the Zerewitinoff-Chugaev reagent.

Compounds having mixed functions, such as caprolactam, ε-aminocaproic acid, α-amino acids, as glycine, cystine, aminobenzoic acid, sarcosine, and their homologs, derivatives, equivalents, and mixtures with themselves or other materials specified or typified herein, may advantageously be used.

As reactive gelling agents, suitable substances may be illustrated by poly(maleic anhydride) or the acid, copolymers of maleic acid, poly(acrylic acid), poly(methacrylic acid), poly (acrylamide), the reaction products of polymers and copolymers of vinyl benzyl chloride with nucleophiles, poly(vinyl pyridine) celluloses and their derivatives, as methyl cellulose or carboxymethyl-cellulose, many copolymers of the aforesaid monomeric materials, the homologs, derivatives, equivalents, as known to the practitioners of the art, as well as the several appropriate mixtures thereof, may advantageously be used.

Non-reactive gelling agents which can be used in this system include polymers and copolymers of vinyl halides, silica soot, certain natural and treated clays, many polymers, such as poly-styrene, -vinyltoluene, tert-butyl styrene, -alkyl acrylates, -alkyl methacrylates, -vinyl ethers, -vinyl esters, -olefins and -diolefins, their homologs, derivatives, equivalents, and mixtures and copolymers thereof, aluminum, and calcium carboxylates.

Also, reinforcing agents, fillers, foaming agents, coloring materials, stabilizing agents, density-regulating agents, as metal powders or hollow spheres, such as the so-called microballoons, conductors or semi-conductors, insulators, etc. or mixtures thereof, may be added as desired to the gel.

As can be seen from the above listings, the reagents or reagent precursors which can be incorporated in the gel or solid and reacted therein are numerous and also, their proportions.

The following examples are given merely to illustrate the invention, but not to limit its scope in any way, and all parts are by weight, unless otherwise stated.

sure to an atmosphere at a temperature in the region of 550°F for about 15 seconds, thus forming a coated line, lighter than water, of the type used in dry fly-fishing.

EXAMPLE II

A mixture was made of 10.0 parts of "Adiprene L100" (a proprietary low molecular weight polymer terminated by isocyanate groups on both ends of each molecule), 0.35 part of 1,4-butanediol, 0.10 parts trimethylolpropane, and 0.05 part of "Versamid 115" (a proprietary brand of long chain polyamide). A 5.2 part portion of the above was mixed with 0.5 g of aluminum palmitate, and 0.08 g of urea-formaldehyde microballoons. This was gelled into shape, and heated to polymerize the polyurethane. A very tough, white, lightweight shaped object resulted. The uncured mixture was coated on a nylon line, and heat cured, forming a floatable line.

EXAMPLE III

An experiment was carried out as given in Example I, except that carbon suboxide, $C_3O_2$, the decomposition product of diacetyl tartaric anhydride and the diisothiocyanate of the diethyl ether of polyethylene glycol were used in individual experiments in place of the tolylene diisocyanate.

EXAMPLE IV

The following combinations were prepared; they formed heat-gellable coatings to which could be added lead powder or glass microballoons to change the density thereof:

| Polymerizing Species | Wt | Gelling Agent | Adjunct No.1 | Wt | Adjunct No.2 | Wt | Adjunct No.3 | Wt | Adjunct No.4 | Wt |
|---|---|---|---|---|---|---|---|---|---|---|
| Low Polymer diisocyanate | 10 | Cab-O-Sil[1] 2.0 | MOCA[2] | 1.0 | 10 — | — | — | — | Colfoam[3] | 0.4 |
| Low Polymer diisocyanate | 5 | — | Butane-1,4-diol | 0.131 | Versamid 115[4] | 0.125 | — | — | — | — |
| Low Polymer diisocyanate | 10 | Cab-O-Sil 2.0 | DB-Oil[5] | 2.5 | Ti(OBu)$_4$[6] | ¼ drop | Versamid 115 | [7] | — | — |
| Low Polymer diisocyanate | 10 | PVC 1.0 | Dimer[8] | — | — | — | — | — | Colfoam | 0.04 |

[1]Cab-O-Sil — proprietary silica soot
[2]MOCA — 4,4'-Methylene-bis-(o-chloroaniline)
[3]Colfoam — "microballoons"
[4]Versamid 115 — proprietary low chain polyamide
[5]DB Oil — proprietary epoxidized fatty acids
[6]Ti(OBu)$_4$ — tetraoxybutyl titanium
[7]Only a trace added
[8]Dimer — proprietary dimerized long chain carboxylic acid mixture

EXAMPLE I

A low molecular weight polyester was prepared by reacting 29.2 parts by weight of adipic acid, 16.0 parts by weight of propylene glycol, catalyzed by 0.1 part by weight of benzene sulfonic acid under reflux, then distilling off 8 parts by weight of water.

To 4 parts by weight of the above polyester was added 1 part by weight of a commercial grade polyvinyl chloride plastisol type resin (Geon ) 0 0.25 part by weight of m-tolylene diisocyanate, and 0.5 part by weight of microballoons, i.e., extremely small size hollow spheres of urea-formaldehyde resin. The composition was coated on a nylon fishing line, cured by expo-

EXAMPLE V

A mixture was made by melting together 0.2 part of "MOCA" and 2.5 parts of "DB Oil", to which was added 10.0 parts of low molecular weight diisocyanate, and 3.0 parts of aluminum stearate. To the above mixture was added 0.21 part microballoons and shaped and cured at 490°F, producing a tough, elastomeric, floating, shaped object.

EXAMPLE VI

Very adherent shaped objects were made by combining 10.0 parts of low molecular weight polymer with isocyanate end groups, 2.5 parts of "Estynox 300" (a low molecular weight proprietary polymer), and 1.25 parts of DB Oil; to this was added 1.5 parts of poly(vinyl chloride). When heat-cured on a nylon line, a very adherent coating was formed.

In like manner, the mixture of 10.0 parts of "Adiprene L" (low molecular weight diisocyanate), 5.0 parts of Estynox 300, and 1.0 parts of poly(vinyl chloride) was made and cured to an adherent shaped object.

EXAMPLE VII

A mixture was made of 10 parts of Adiprene L, 1.5 parts of MOCA, 0.7 part of Versamid 125, a long chain diamide, 0.5 part of polystyrene powder, and 0.1 part microballoons. This was gelled to a shaped object, and cured at 500°F.

In a similar set of experiments, tert. butyl styrene microgels, polyvinyl toluene, poly(ethyl acrylate), poly(methyl methacrylate), poly(viny isobutyl ether), poly(vinyl acetate-butyrate), poly(isobutylene) and poly(butadiene) were used in place of the poly(styrene).

EXAMPLE VIII

This example illustrates the use of water, reacting with the coating mixture components to generate a gas that foams the mixture.

To 2.5 parts DB Oil, 0.5 part poly(vinyl chloride), 0.2 g aluminum palmitate, 1 drop of tetraoxybutyl titanium, which was mixed and then 10.0 parts Adiprene L added and the mixture stirred. Then 1 drop of water was added, and the shaped mixture cured at 400°F. The shaped plastic was full of bubbles, had good strength, and floated in water.

EXAMPLE IX

A. A mixture was prepared of 10.0 parts Adiprene L, 1.0 parts of MOCA, 2.5 parts of DB Oil. This mixture was cured at 450°F, giving a very tough film.

B. Then 0.5 part of "Geon 121" poly(vinyl chloride) was added to a mixture as described above. This could be shaped, and cured to a shaped object.

C. Another mixture (B) was prepared, to which was added 0.1 part microballoons. This produced a shaped, floatable cured object.

D. Another mixture (C) was prepared, to which was added 1 drop of Ti(OBu)$_4$. A faster cure of the shaped floatable object was effected.

EXAMPLE X

A low molecular weight polyester was prepared by the esterification of polyglycol with phthalic acid.

This polyester was gelled and shaped by adding 20% poly(vinyl chloride) and 5% tolylene diisocyanate, and shaped. Cure was effected at 480°F.

In a similar experiment, methyl cellulose was added to promote hot set of the shaped object.

In another experiment, the polyglycol was reacted with adipoyl dichloride to form the low molecular weight plasticizing polyester.

EXAMPLE XI

A low-molecular weight copolymer was prepared by condensation of thio(diacetic acid) with an excess of ethylene diamine. To 10.0 parts of the above was added 1.0 parts of tolylene diisocyanate, and 2.0 parts of poly(hydroxyethyl acrylate) and 0.08 part of microballoons. This was gelled into shape around a nylon line core, and cured at 400°F to form a coated fishing line.

In similar experiments, poly(methyl methacrylate), poly(maleic anhydride-acid mixture), poly(acrylamide), poly(vinylbenzyl chloride) and its reaction products with nucleophilic reagents were used in place of the poly-(hydroxyethyl acrylate).

As can be seen, many modifications can be made without departing from the scope of the invention, and the invention is not limited by the example except as defined by the following claims.

I claim:

1. A process for the preparation of a fly-fishing line comprising
   a. coating a line core with a mixture comprising (1) a compound selected from the group consisting of isocyanate, diisocyanate, polymeric diisocyanate, carboxylic acid halide, carbamyl halide, ketenes, carbon suboxide, malonic acid, malonyl halide, diacetyl tartaric anhydrides and mixtures thereof; (2) at least one compound having groups reactive with said compounds of (1), selected from the group consisting of alkyl and alkaryl diols, glycerine, pentaerythritol, sugars, polybasic acids, polyamines, aminoacids; and (3) less than 31% (percent by parts of total mixture) of a gelling agent selected from the group consisting of polyacrylamide, polyalkylacrylates, polyalkylmethacrylates, polystryene, polyvinyl toluene, polyolefins, polyvinyl ethers, silica soot, aluminum carboxylates, calcium carboxylates and mixtures thereof;
   b. gelling said coating on said line core; and
   c. further polymerizing said gelled coating.

2. A process for the preparation of a fly-fishing line in accordance with claim 1 wherein said isocyanate is a diisocyanate.

3. A process for the preparation of a fly-fishing line in accordance with claim 1 wherein said isocyanate is a polymeric diisocyanate.

4. A process for the preparation of a fly-fishing line in accordance with claim 1, wherein said compound of group (1) is carbon suboxide or ketenes.

5. A process for the preparation of a fly-fishing line, in accordance with claim 2 wherein at least one additive of the group synthetic microballoons, metal powders, foaming agents or coloring agents is added to said mixture.

6. A fly-fishing line comprising a coating and a line core, said coating comprising (1) a compound selected from the group consisting of isocyanate, diisocyanate, polymeric diisocyanate, carboxylic acid halide, carbamyl halide, ketenes, carbon suboxide, malonic acid, malonyl halide, diacetyl tartaric anhydrides and mixtures thereof; (2) at least one compound having groups reactive with said compounds of (1), selected from the group consisting of alkyl and alkaryl diols, glycerine, pentaerythritol, sugars, polybasic acids, polyamines, aminoacids; and (3) less than 31% (percent by parts of total mixture) of a gelling agent selected from the group consisting of polyacrylamide, polyalkylacrylates, polyalkylmethacrylates, polystyrene, polyvinyl toluene, polyolefins, polyvinyl ethers, silica soot, aluminum carboxylates, calcium carboxylates and mixtures thereof.

7. A fly-fishing line in accordance with claim 6 in which said line core is nylon.

8. A fly-fishing line in accordance with claim 7 in which at least one additive of the group synthetic microballoons, metal powders, foaming agents or coloring agents is added to said mixture.

* * * * *